(12) United States Patent
Bonfoey

(10) Patent No.: US 7,581,514 B2
(45) Date of Patent: Sep. 1, 2009

(54) PET DRYING DEVICE

(76) Inventor: Inge Bonfoey, 19568 Lakeshore Dr., Three Rivers, MI (US) 49093

( * ) Notice: Subject to any disclaimer, the term of this patent is extended or adjusted under 35 U.S.C. 154(b) by 176 days.

(21) Appl. No.: 11/430,057

(22) Filed: May 8, 2006

(65) Prior Publication Data

US 2007/0289558 A1 Dec. 20, 2007

(51) Int. Cl.
 *A01K 13/00* (2006.01)
(52) U.S. Cl. ..................................................... 119/850
(58) Field of Classification Search ................. 119/600, 119/652, 654, 850; D30/144, 145
 See application file for complete search history.

(56) References Cited

U.S. PATENT DOCUMENTS

| | | | |
|---|---|---|---|
| 1,432,249 A | 10/1922 | Hoyme | 2/69 |
| 1,497,685 A | 6/1924 | Hoyme | 2/67 |
| 2,620,475 A * | 12/1952 | Legg et al. | 2/50 |
| 3,013,274 A | 12/1961 | Dike | 2/69 |
| 3,079,611 A * | 3/1963 | Boryszewski | 2/89 |
| 5,082,707 A * | 1/1992 | Fazio | 428/43 |
| 5,423,711 A * | 6/1995 | Dorland | 450/57 |
| 5,458,094 A | 10/1995 | Proshan | 119/850 |
| 5,664,258 A | 9/1997 | Harris | 2/84 |
| 6,024,055 A * | 2/2000 | Jesse et al. | 119/850 |
| 6,058,890 A * | 5/2000 | Harrell | 119/850 |
| 6,170,438 B1 | 1/2001 | Marwah et al. | 119/600 |
| D465,317 S * | 11/2002 | Darling | D2/824 |
| 6,481,383 B1 * | 11/2002 | Ross et al. | 119/850 |
| 6,584,939 B1 * | 7/2003 | Brezinski | 119/850 |
| 6,662,754 B1 | 12/2003 | Wilson | 119/850 |
| 7,174,570 B2 * | 2/2007 | Dabney et al. | 2/48 |
| 7,260,853 B2 * | 8/2007 | Newman | 2/115 |
| 2002/0088410 A1 * | 7/2002 | Burnett | 119/850 |
| 2005/0039702 A1 | 2/2005 | Laffoon | 119/850 |
| 2005/0095393 A1 * | 5/2005 | Tabor-Cooper | 428/99 |
| 2005/0102727 A1 * | 5/2005 | Kelly | 2/69 |
| 2005/0263104 A1 * | 12/2005 | Lazarowich | 119/850 |
| 2007/0056530 A1 * | 3/2007 | Nassour | 119/850 |
| 2007/0204808 A1 * | 9/2007 | Harada | 119/850 |
| 2007/0234970 A1 * | 10/2007 | Farzan et al. | 119/850 |

* cited by examiner

*Primary Examiner*—Kimberly S Smith
(74) *Attorney, Agent, or Firm*—Henneman & Associates, PLC; Larry E. Henneman, Jr.

(57) ABSTRACT

A novel pet drying garment includes a top section, a middle section, and a bottom section formed of an absorbent material, and having at least one fastener for securing the bottom section over the lateral edges of the top section. In a particular embodiment, the garment is made of a form fitting cotton towel material, and includes an extended neck section with a collar portion and a pocket for holding a removable anti-odor device. In a more particular embodiment, the garment includes multiple layers or absorbent material, some of which are removable and disposable.

25 Claims, 4 Drawing Sheets

PET DRYING DEVICE

BACKGROUND OF THE INVENTION

1. Field of the Invention

This invention relates generally to garments for animals, and more particularly to absorbent garments for animals. Even more particularly this invention relates to an absorbent garment to be worn by a wet animal to dry the animal and protect surrounding objects from being soiled by the wet animal.

2. Description of the Background Art

As many pet owners understand, wet pets (e.g., dogs) can be problematic. Whether a pet swims, bathes, is outdoors in rainy weather, or is exposed to other sources of moisture, it is very important to adequately dry the animal so that unpleasant odors, skin conditions, or illness do not occur. Adequately drying a wet pet can often be difficult and/or time consuming. Many pet owners will simply attempt to towel their pet as best as they can, or use devices such as hair driers to dry their pet. Many pets are frightened of devices such as hair dryers, and conventional towel drying is only partially effective, leaving the pet wet or at least damp.

One problem with incomplete drying is that the wet or damp animal, particularly a dog, will often rub against furniture, carpets, vehicle seats, and so on until completely dry. This rubbing can cause unpleasant odors, stains, or permanent damage to such surfaces. As a result, the pet owner may need to keep the dog away from furniture, carpeting, and other objects until the dog is fully dry. Alternatively, the owner can leave the wet animal outside, but the dog may become wet dirty again. In any case, the owner and/or the dog may prefer that the dog be let inside the house, but for the potential damage to the furnishings of the house.

Many pet garments are known to exist. However, few address the problem of a wet pet. Most known pet garments are protection-type garments that are intended to be worn by a clean, dry animal in order to protect the animal from precipitation or cold temperatures. The problem with these protection-type pet garments is that if the animal becomes wet, the pet garment will often keep the animal wet, preventing water from leaving the animals fur. This trapped moisture can result in unpleasant odors, skin problems, or even illness for the animal.

Some pet drying garments are known, but these garments are typically restrictive in nature, and are not intended to be worn for extended periods of time. Such garments are designed for use by pet grooming or veterinary establishments. These garments typically restrain a wet animal, in order to prevent the animal from scratching, biting, or becoming unruly while being dried. For example, U.S. Pat. No. 6,170,438 issued to Marwah et al. discloses a multipurpose bathrobe for pets. However, the device of Marwah et al. completely encloses the pet (except for the head and tail), so that the animal is not free to walk around. Restraining the animal in this manner can be traumatic, or at least unpleasant, for the animal and is, therefore, considered to be a significant disadvantage.

What is needed, therefore, is a pet drying garment that can be worn by a wet animal over an extended period of time. What is also needed is a pet drying garment that does not unnecessarily restrict the movement of the pet. What is also needed is a pet drying garment that protects surrounding furnishings from a wet pet. What is also needed is a pet drying garment that remains on the pet even if the pet rubs against objects. What is also needed is a pet drying garment that removes moisture from the pets fur, but does not transfer the moisture to the animals surroundings.

SUMMARY

The present invention overcomes the problems associated with the prior art by providing a pet drying garment that is worn by a wet animal in order to dry the animal, but is not unnecessarily restrictive. The invention facilitates unrestrictive, unattended drying of an animal by providing a garment that is absorbent, form fitting, and easily fastened on the animal, yet does not inhibit the animal's movements or bodily functions. Further, various embodiments of the invention can be reusable, washable, or even disposable in nature.

The pet drying garment includes a middle section, a top section, and a bottom section. The middle section includes an opening for passage of the head and neck of the animal. The top section extends from one side of the middle section along the back of the animal to the tail, and the bottom section extends from the opposite side of the middle section, along the chest and abdomen, to a point in front of the rear legs of the animal. The top section has two lateral edges and a width sufficient to drape one of the lateral edges over each side of the animal. The bottom section has a wrapping portion of sufficient width to wrap over the lateral edges of the top section. Additionally, the pet drying garment includes at least one fastener for securing the wrapping portion of the bottom section over the lateral edges of the top section. Preferably, the entire garment is made of at least one layer of absorbent material.

In one particular embodiment, the width of the wrapping portion is sufficient to extend completely around the animal. In a more particular embodiment, the fastener includes an engaging device fixed to one side of the wrapping portion, and a complementary engaging device fixed to an opposite side of the wrapping portion. The fastener is connected securing the engaging device to the complementary engaging device over the back of the animal.

Optionally, the device includes a collar around the opening of the middle section. In a particular embodiment the collar is elongated and may be extended to cover the neck and a portion of the head of the animal. The collar can include means for attaching a leash and/or a pocket section for holding a changeable anti-odor device such as an odor neutralizing sheet.

According to another aspect of the invention, a portion of the top section is constructed such that the tail of the animal is generally surrounded at the base. This helps keep the garment on the animal, yet the animal's movement and bodily functions are not restricted. In one embodiment, the rear portion of the top section of the garment defines an opening to facilitate the passage of the animal's tail. In an alternate embodiment, the top section includes at least one rear fastener for securing a rear portion of the top section around the base of the animal's tail.

The garment generally conforms to the shape of the animal. In the particular embodiment shown, the bottom section includes a narrow section that passes between the animal's front legs and a wide section sufficient to overlap the lateral edges of the top section.

The garment is designed to wick moisture away from the fur of the animal wearing the garment. For example, the absorbent material of the middle, top, and/or bottom section can be made from towel material (e.g., a cotton or cotton blend terry cloth) that is machine washable. The embodiment shown can be made from a single, unitary piece of such material. In one particular embodiment, the bottom section of the garment includes additional layers of absorbent material. Optionally, some of the absorbent layers are removable from the garment. For example, the garment can include pockets to hold disposable absorbent paper material. Ideally, but not necessarily, the material is sufficiently absorbent to absorb moisture in excess of the dry weight of the material.

Optionally, the pet drying garment can include an outer water resistant layer to prevent moisture in the absorbent layer from leaking onto other objects (e.g., furniture, carpeting, etc.). One embodiment with a water resistant outside layer is made to be disposable. Similar to disposable baby diapers, the disposable version of the pet drying garment includes an inner barrier layer, a middle absorbent layer, and an outer water resistant layer.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a pet drying garment that can be comfortably worn by a wet animal without restricting the animals natural movement. The garment helps dry the animal and protects objects (e.g., carpeting, furniture, etc.) in the animals environment from being soiled by the wet animal.

In the following description, numerous specific details are set forth (e.g., particular shape, location and type of fasteners, material type, etc.) in order to provide a thorough understanding of the invention. Those skilled in the art will recognize, however, that the invention may be practiced apart from these specific details. In other instances, details of well known garment manufacturing practices (e.g., sewing patterns and methods) and components have been omitted, so as not to unnecessarily obscure the present invention.

Figure 1:
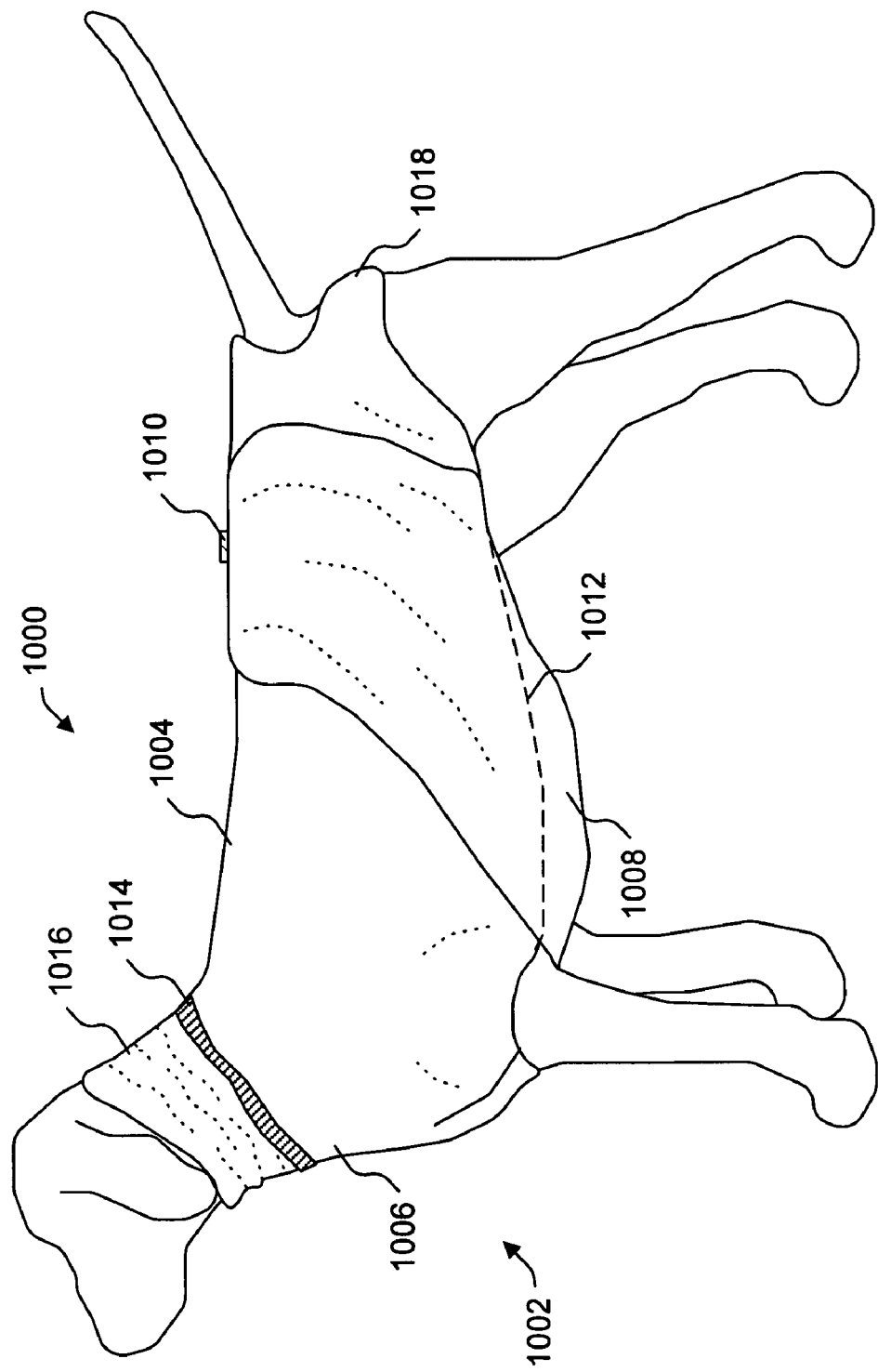
FIG. 1 is a side view of a dog wearing a pet drying garment of the present invention.

FIG. 1 shows a side view of an animal 1000 (a dog in this example) wearing a pet drying garment 1002. Pet drying garment 1002 includes a top section 1004, a middle section 1006, and a bottom section 1008. Top section 1004 and bottom section 1008 extend from opposing sides of middle section 1006. Middle section 1006 defines an opening for the head of dog 1000 and includes a collar 1014 with an extended neck section 1016. Optionally, collar 1016 includes some means for attaching a leash or other device (not shown), or an aperture to provide access to a separate conventional dog collar being worn by dog 1000.

Extended neck section 1016 extends from collar 1014 and generally covers at least a portion of the dog's 1000. Extended neck section 1016 can also be pulled forward to cover a portion of the dog's 1000 head (e.g., ears, back or top of head, etc.).

Top section 1004 generally extends from the neck of dog 1000 to the tail of dog 1000 along the dog's back, and has a width sufficient to drape along the sides of dog 1000. Top section 1004 includes lateral edges 1012, which generally run across the front shoulders of dog 1000 to the rear of the hind legs of dog 1000. A rear portion 1018 of top section 1004 is connected behind the hind legs of dog 1000 to form an opening generally surrounding the base of the dog's 1000 tail.

Bottom section 1008 generally extends from the chest of dog 1000, along the abdomen to a point just in front of the rear legs. Bottom section 1008 has a shape that facilitates the comfortable passage of bottom section 1008 between the front legs of dog 1000, and yet has sufficient width to extend over lateral edges 1012 of top section 1004 and secure over the back of animal 1000 with one or more fasteners 1010.

Figure 2:
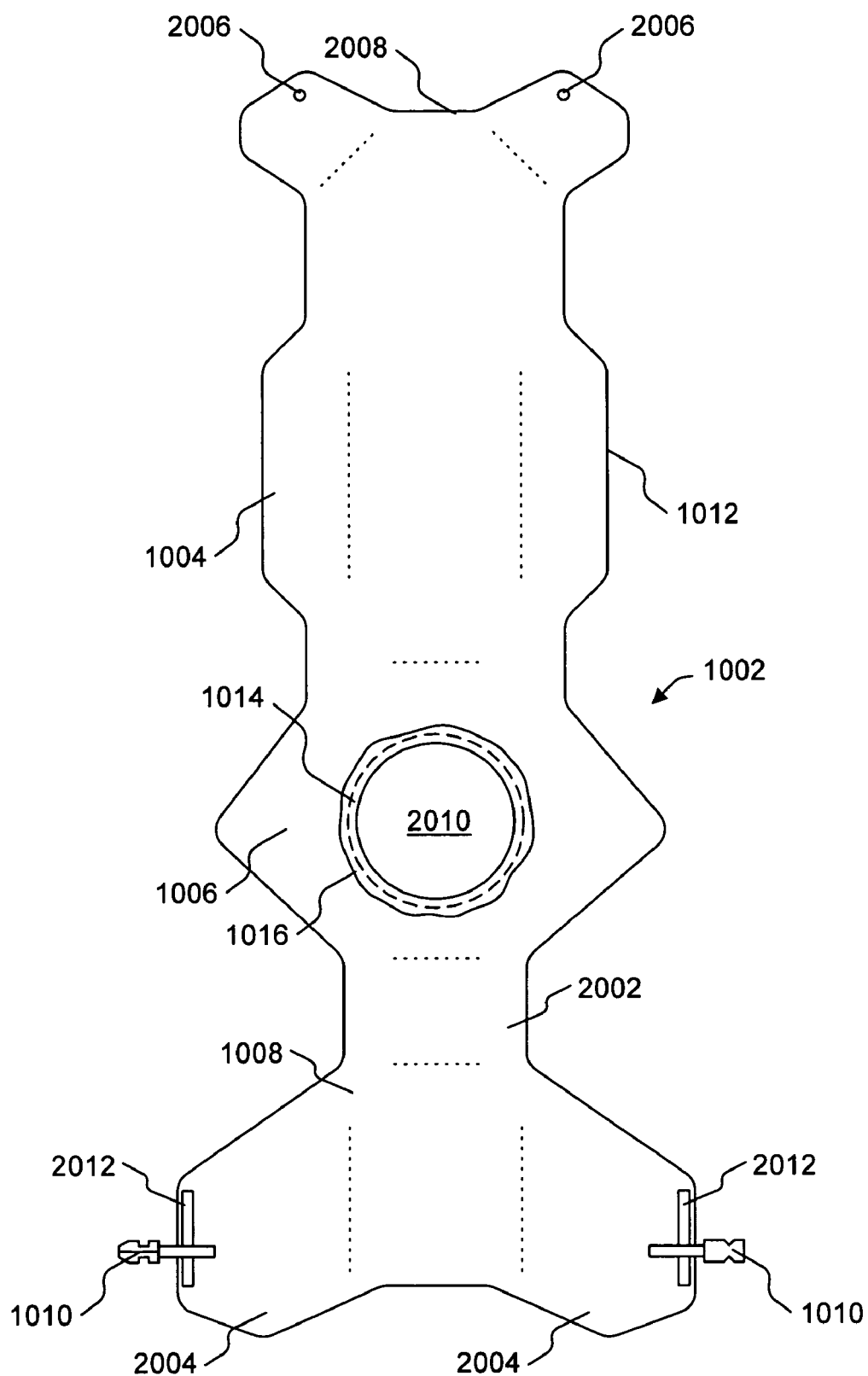
FIG. 2 is a top view of the pet drying garment of FIG. 1 in an unfolded position.

FIG. 2 shows a top view of pet drying garment 1002 unfolded and laid out on a flat surface. Top section 1004 has a generally uniform width, with the exception of being slightly narrower near middle section 1006 and rear portion 1018. Additionally, top section 1004 includes a rear edge 2008 shaped to allows rear portion 1018 to fit generally around the base of the tail of animal 1000, where it is secured by rear fasteners 2006. In this example embodiment, rear fasteners 2006 are devices such as snaps, button/button hole, hook and loop material, and so on. Alternatively, rear portion 1018 of top section 1004 can define a permanent aperture to accept the tail of dog 1000. Examples, of such an opening include a hole in the fabric of top portion 1004 or permanently attaching (e.g., by sewing) the opposite sides of rear section 1018.

Middle section 1006 includes an opening 2010 for the head and is generally shaped to cover the neck and shoulders of dog 1000. Collar 1016 and elongated neck section 1014 are fastened around opening 2010, which is disposed generally in the center of middle section 1006. Collar 1016 and elongated neck section 1014 are sized to fit comfortably around the neck of animal 1000 while maintaining contact between garment 1002 and the fur of dog 1000. Middle section 1006 further serves to physically connect top section 1004 and bottom section 1008.

Bottom section 1008 of pet drying garment 1002 includes a narrow portion 2002 and wider wrapping portion 2004. Narrow portion 2002 is shaped to fit along the chest and pass comfortably between the front legs of animal 1000. Wrapping portion 2004 is shaped to cover the abdomen and extend over the draping lateral edges 1012 of top section 1004. In this particular example, wrapping portion 2004 extends almost completely around dog 1000 and is secured over the back of animal 1000 with fasteners 1010. However, it is not necessary for wrapping portion 2004 to extend all the way around dog 1000. For example, hook and loop fastener (VELCRO™) 2012 can be fastened the lateral edges of wrapping portion 2004 as a substitute for fasteners 1010. Then, wrapping section 2004 need only be wide enough to extend over and engage the lateral edges 1012 of top portion 1004.

Figure 3:
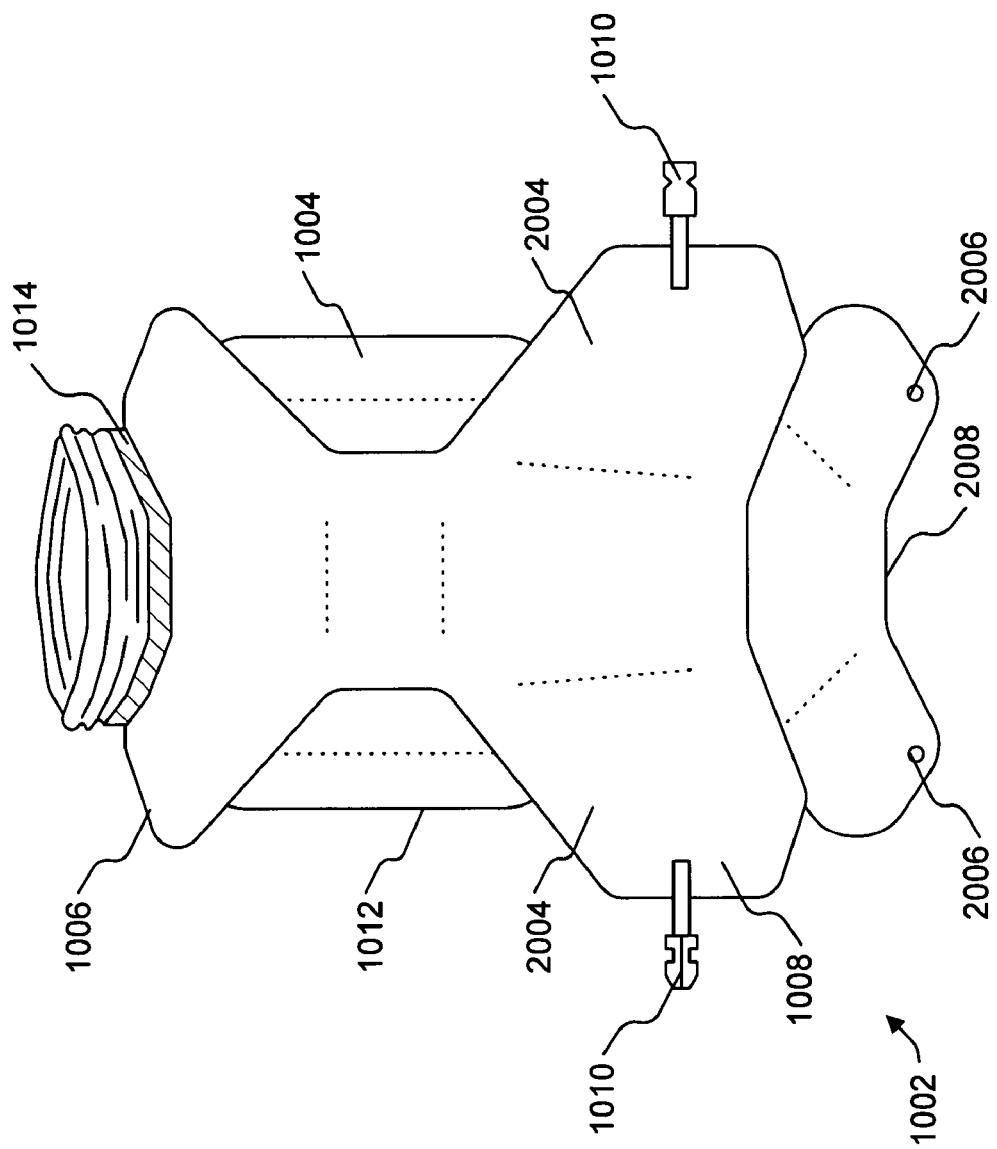
FIG. 3 is a front view of the pet drying garment of FIG. 1 partially folded.

FIG. 3 shows a front view of pet drying garment 1002 in a partially folded manner, as if hanging on a hanger. This view of pet drying garment 1002 is shown to further clarify the design and contours of pet drying garment 1002. As can be seen, wrapping portions 2004 of bottom section 1008 extend outward to a sufficient length to allow lateral edges 1012 of top section 1004 to be at least partially covered when wrapping portions 2004 are secured together over the back of animal 1000 with fasteners 1010, as shown in FIG. 1.

The design of garment 1002 also allows dog 1000 to urinate and/or defecate while wearing garment 1000. As indicated above, bottom section 1008 generally ends in front of the hind legs of dog 1000, thus allowing dog 1000 to urinate without obstruction. Top section 1004 extends far enough to secure behind the hind legs of dog 1000. The shape of rear edge 2008 allows for pet drying garment 1002 to generally surround the tail of animal 1000, without obstructing the anus of dog 1000.

Figure 4:
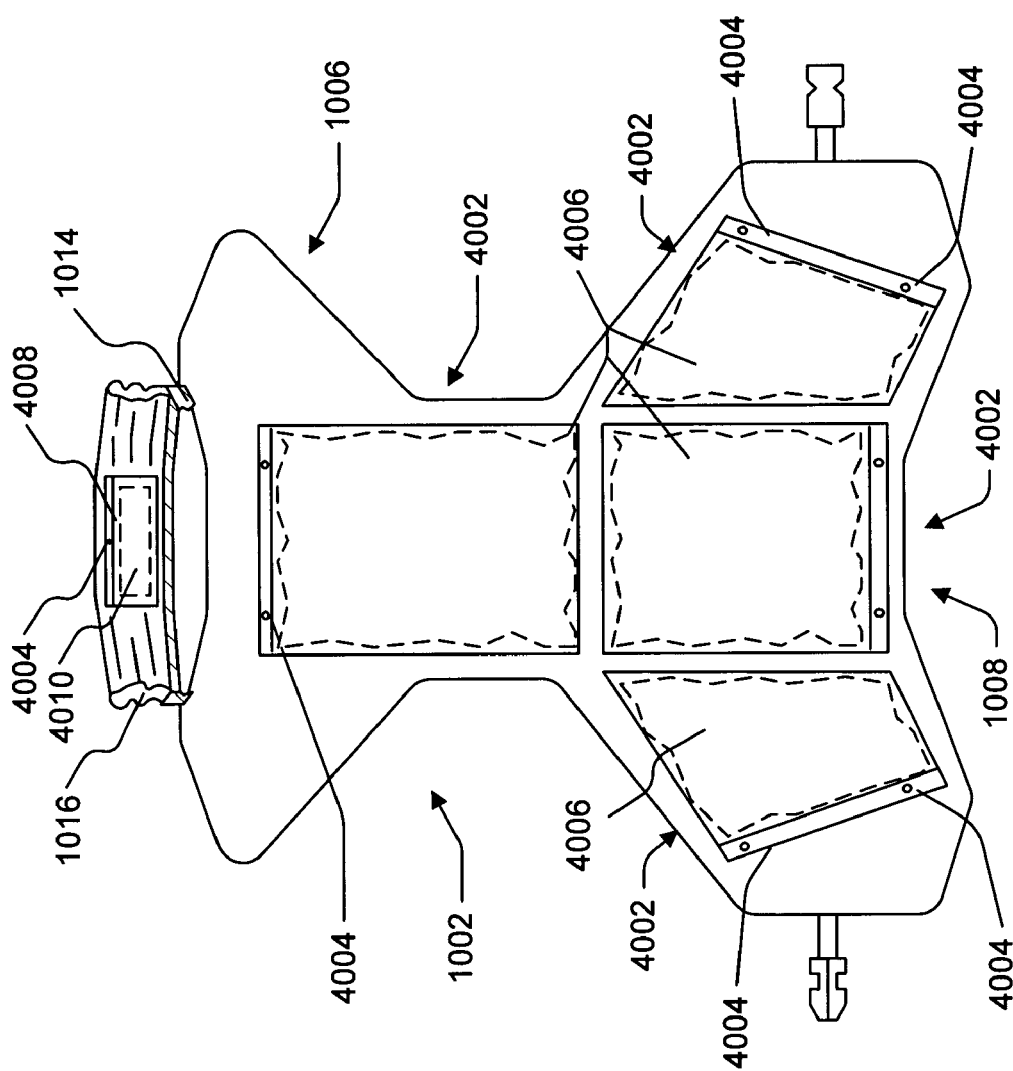
FIG. 4 is an internal view of the bottom section and part of the middle section of the pet drying garment of FIG. 1.

FIG. 4 is an internal view of bottom section 1008 and part of the middle section 1006. As shown, garment 1002 includes a plurality of pockets 4002 for holding additional layers of absorbent material 4006 therein. In this particular embodiment of pet drying garment 1002, pockets 4002 are placed in bottom section 1008, and extend into some portions of middle section 1006. Removable absorbent material 4006 is placed within pockets 4002 to aid in absorbing the liquid that will naturally collect on the underside of the animal, due to gravity. Pockets 4002 are themselves formed from a material that allows moisture to flow from the fur of dog 1000 through to the absorbent material 4006 inside. Absorbent material 4006 can any suitably absorbent material including, but not limited to, cloth, sponge, and paper. One benefit of removable absorbent material 4006 is that after it collects moisture shed from animal 1000, it can be easily replaced with new dry material. The removable absorbent material 4006 can be either reusable or disposable.

Extended neck section 1014 also includes a pocket 4008 for holding an anti-odor device 4010. Anti-odor device 4010 can be any device used to either mask or neutralize odors associated with wet animals. Alternately, pocket 4008 can be used to hold additional absorbent material 406 as described above. Pockets 4002 and 4008 are optionally secured by one or more fastening devices 4004, which can include, for example, a button, a snap, hook and loop material, or some other suitable fastener.

Pet drying garment 1002 is constructed of a pliable, machine-washable, absorbent material, such as cotton towel material typically used to make bath towels. Making garment 1002 from a bulky terry cloth material contributes to both the absorbency and form fit of garment 1002. Additionally, garment 1002 can be easily laundered with and/or in the same manner as bath towels and wash cloths.

The description of particular embodiments of the present invention is now complete. Many of the described features may be substituted, altered or omitted without departing from the scope of the invention. For example, the particular size and shape can be changed to accommodate different sizes and breeds of dogs, or for different species of animals. As another example, the pocket sections disclosed herein can be omitted or replaced with extra permanent layers of fabric. As yet another example, a water resistant outer layer can be added to the garment to prevent moisture from the environment (e.g., rain) entering the absorbent material and to prevent moisture from the absorbent material from soiling objects (e.g., carpet, furniture, bedding, etc.) in the environment. As yet another example, the entire pet drying garment can be made disposable by manufacturing the garment from the same or similar materials as conventional disposable baby diapers. These and other deviations from the particular embodiments shown will be apparent to those skilled in the art, particularly in view of the foregoing disclosure.

I claim:

1. A pet drying garment to be worn by an animal, said garment comprising;
    a middle section including an opening to facilitate the passage of the head and neck of said animal;
    a top section extending from one side of said middle section along the back of said animal to the tail of said animal, said top section having two lateral edges and a width sufficient to drape one of said lateral edges over each side of said animal; and
    a bottom section extending from an opposite side of said middle section along the chest and abdomen of said animal to the rear legs of said animal, said bottom section having a wrapping portion of sufficient width to wrap over said lateral edges of said top section; and
    at least one fastener for securing said wrapping portion of said bottom section over said lateral edges of said top section; and
    wherein each of said middle section, said bottom section, and said top section include at least one layer of an absorbent material; and
    said top section is constructed such that the tail of said animal is generally surrounded at the base.

2. A pet drying garment according to claim 1, wherein said width of said wrapping portion is sufficient to extend completely around said animal.

3. A pet drying garment according to claim 2, wherein said fastener includes:
    an engaging device fixed to one side of said wrapping portion; and
    a complementary engaging device fixed to an opposite side of said wrapping portion;
    whereby said engaging device can be secured to said complementary engaging device over the back of said animal.

4. A pet drying garment according to claim 1, further comprising a collar around said opening of said middle section.

5. A pet drying garment according to claim 4, wherein said collar is elongated.

6. A pet drying garment according to claim 4, wherein said collar portion includes a means for attaching a leash.

7. A pet drying garment according to claim 4, wherein said collar further includes a pocket section.

8. A pet drying garment according to claim 7, wherein said pocket section holds a changeable anti-odor device.

9. A pet drying garment according to claim 8, wherein said changeable anti-odor device is an odor neutralizing sheet.

10. A pet drying garment according to claim 1, wherein a rear portion of said top section defines an aperture to facilitate the passage of said tail of said animal.

11. A pet drying garment according to claim 1, wherein said top section includes at least one rear fastener for securing a portion of said top section around the base of said tail of said animal.

12. A pet drying garment according to claim 1, wherein said bottom section includes a narrow section to facilitate passage between the front legs of said animal, and a wide section sufficient to overlap said lateral edges of said top section.

13. A pet drying garment according to claim 1, wherein said bottom section includes a plurality of layers of absorbent material.

14. A pet drying garment according to claim 13, wherein at least some of the plurality of layers of absorbent material are removable.

15. A pet drying garment according to claim 14, wherein said removable absorbent layers are disposable.

16. A pet drying garment according to claim 15, wherein said disposable layers are paper.

17. A pet drying garment according to claim 1, wherein said pet garment further includes a water resistant outside layer.

18. A pet drying garment according to claim 1, wherein said absorbent material is sufficient to absorb moisture in excess of the dry weight of said material.

19. A pet drying garment according to claim 1, wherein said absorbent material is machine washable.

20. A pet drying garment according to claim 1, wherein said absorbent material is a cloth towel material.

21. A pet drying garment according to claim 20, wherein said cloth towel material includes cotton.

22. A pet drying garment according to claim 20, wherein said absorbent material is terry cloth.

23. A pet drying garment according to claim 1, wherein said pet drying garment is disposable.

24. A pet drying garment according to claim 1, wherein said pet drying garment is formed from a unitary piece of material.

25. A pet drying garment to be worn by an animal, said garment comprising;
- a middle section including an opening to facilitate the passage of the head and neck of said animal;
- a top section extending from one side of said middle section along the back of said animal to the tail of said animal, said top section having two lateral edges and a width sufficient to drape one of said lateral edges over each side of said animal; and
- a bottom section extending from an opposite side of said middle section along the chest and abdomen of said animal to the rear legs of said animal, said bottom section having a wrapping portion of sufficient width to wrap over said lateral edges of said top section;
- at least one fastener for securing said wrapping portion of said bottom section over said lateral edges of said top section; and
- means for absorbing moisture from fur of said animal; and wherein
- said top section is constructed such that the tail of said animal is generally surrounded at the base.

* * * * *